(12) United States Patent
Kosuge

(10) Patent No.: US 6,820,882 B2
(45) Date of Patent: Nov. 23, 2004

(54) VEHICLE REAR BODY STRUCTURE

(75) Inventor: Masami Kosuge, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/125,861

(22) Filed: Apr. 19, 2002

(65) Prior Publication Data

US 2002/0180243 A1 Dec. 5, 2002

(30) Foreign Application Priority Data

Jun. 5, 2001 (JP) ........................................ 2001-169761

(51) Int. Cl.[7] .............................................. B60G 15/00
(52) U.S. Cl. .............................................. 280/124.147
(58) Field of Search ................... 280/124.147, 124.155, 280/788, 781; 296/204, 198, 30

(56) References Cited

U.S. PATENT DOCUMENTS

| 3,992,027 A | * | 11/1976 | Legueu ........................ 280/788 |
| 4,482,135 A | * | 11/1984 | Ishida et al. ................. 267/220 |
| 4,875,704 A | * | 10/1989 | Tomosada et al. .... 280/124.152 |
| 5,350,214 A | * | 9/1994 | Yamauchi et al. ........... 296/204 |
| 6,520,494 B1 | * | 2/2003 | Andersen et al. ........... 267/273 |

* cited by examiner

Primary Examiner—Faye M. Fleming
(74) Attorney, Agent, or Firm—Merchant & Gould, P.C.

(57) ABSTRACT

A vehicle rear body structure has left and right gussets for coupling left and right damper mounting portions and a floor cross member. The left and right damper portions serve as component parts on which left and right dampers are mounted to mitigate impacts transmitted from left and right rear wheels and hence is required to have increased strength. The left and right damper mounting portions are coupled to the floor cross member with high rigidity via the left and right gussets and are so reinforced.

5 Claims, 10 Drawing Sheets

VEHICLE REAR BODY STRUCTURE

FIELD OF THE INVENTION

This invention relates to a vehicle rear body structure configured to prevent a decrease in axial strengths of fixture bolts for rear-wheel dampers and to increase workability in tightening the dampers and a damper-mounting-portion reinforcing member together to damper mounting portions.

BACKGROUND OF THE INVENTION

A conventional vehicle rear body structure is exemplified in FIGS. 9 and 10 hereof. In FIG. 9, wheel houses 101, 102 which accommodate left and right rear wheels are located at left and right sides of a rear floor panel 100. Damper mounting portions 103, 104 are located at routs or joints of the wheel houses 101, 102 for mounting left and right dampers 108, 109 to mitigate impacts or shocks transmitted from the rear wheels and to support the rear wheels. A reinforcement bar 105 serving as a damper-mounting-portion reinforcing member is arranged to extend between the damper mounting portions 103, 104 to allow the damper mounting portions 103, 104 to have increased rigidity. Reference numeral 107 designates a concave section for storing a spare tire. The reinforcement bar 105 is comprised of terminal metal fixtures 111, 112 secured to the damper mounting portions 103, 104, respectively, and a bar 113 unitarily coupled to the terminal metal fixtures 111, 112.

As shown in FIG. 10, both ends of the reinforcement bar 105 are tightened to the damper mounting portions 103, 104 together with the dampers. The terminal metal fixtures 111, 112 of the reinforcement bar 105 have pluralities of bolt insertion bores 114, 115, respectively, fitting a plurality of bolts 116 provided at upper distal ends of respective dampers into associated mounting bores, not shown, which are formed in the damper mounting portions 103, 104, upward from a rear side to allow the bolts 116 to pass through the bolt insertion bores 114, 115 of the terminal metal fixtures 111, 112, respectively, permits a nut, not shown, to be screwed onto each of the bolts 116.

Since the reinforcement bar 105 has mounting pitches P1, P2 (i.e., distances between bolts 116, 116 of the left and right dampers) which are substantially equal to a distance between the left and right wheels, such a structure suffers from an issue of increased manufacturing errors in the distance between the bolt insertion bore 114 and the bolt insertion bore 115. In order to absorb the manufacturing errors, the insertion bores 114, 114 for either ones of the left and right bolts are formed in elongated apertures.

Thus, the presence of the bolt insertion bore 114 formed in the elongated aperture causes a seating surface, which bears a nut to be screwed onto the bolt 116, to have a decreased surface area with a resultant increase in surface pressure acting on the seating surface when rotating the nut to be tightened with a given tightening torque. It seems that excessively higher the surface pressure of the seating surface, the lower will be the axial strength of the bolt due to deformation in the seating surface.

When tightening both the dampers 108, 109 and the reinforcement bar 105 together to the damper mounting portions 103, 104, mounting work must be initially carried out for mounting the terminal metal fixture 111 of the reinforcement bar 105 together with the dampers 108, 109 in an unsteady condition wherein the terminal metal fixture 112 of the reinforcement bar 105 is merely placed on the one-side damper mounting portion 104. This results in displacement of the terminal fixture 111 during the mounting operation to cause troublesome work in mounting the terminal metal fixture 111, resulting in deteriorated workability.

SUMMARY OF THE INVENTION

It is therefore an object of the present invention to provide an improved vehicle rear body structure which suppresses deterioration in axial strength of mounting bolts for rear-wheel dampers while providing improved workability in tightening both dampers and a damper-mounting-portion reinforcing member to damper mounting portions.

According to an aspect of the present invention, there is provided a vehicle rear body structure which comprises left and right damper mounting portions for mounting left and right dampers, which mitigate impacts transmitted from left and right rear wheels, to a vehicle body, respectively, a floor cross member disposed in the vicinity of the left and right damper mounting portions, and left and right gussets for coupling the left and right damper mounting portions and the floor cross member with respect to one another for reinforcing the left and right damper mounting portions.

With such a vehicle rear body structure, the presence of a structure wherein the left and right damper mounting portions are connected to the floor cross member at areas in the vicinity of the damper mounting portions via the left and right gussets enables the left and right damper mounting portions to have increased rigidity while shortening the mounting pitch, according to the present invention, to a lower value than that of the reinforcement bar employed in the conventional practice, resulting in a decrease in errors in the mounting pitches. Consequently, for example, when tightening the dampers and the gussets together to the damper mounting portions, there is no need for the bores formed in the gussets to pass the mounting bolts, formed at the upper portions of the dampers, to be formed in a larger size than that of an outer diameter of the mounting bolt of the damper, enabling the seating surface of the gusset which bears the nut to be screwed onto the mounting bolt to have an increased surface area. Accordingly, it is possible to preclude a decrease in the axial strength of the mounting bolt of the damper even when increasing the tightening torque of the nut discussed above.

Further, the damper and the gusset can be tightened together at the damper mounting portion under a condition where the gusset is mounted to the floor cross member, resulting in am improvement in the workability while enabling a productivity to be improved.

In the vehicle body structure arranged in accordance with the present invention, connecting the above left and right gussets with the rod enables the rigidity of the left and right damper mounting portions to be further improved with favorable results.

BRIEF DESCRIPTION OF THE DRAWINGS

Certain preferred embodiments of the present invention will be described in more detail below, by way of example only, with reference to the accompanying drawings, in which.

DETAILED DESCRIPTION OF THE PREFERRED EMBODIMENTS

Figure 1:
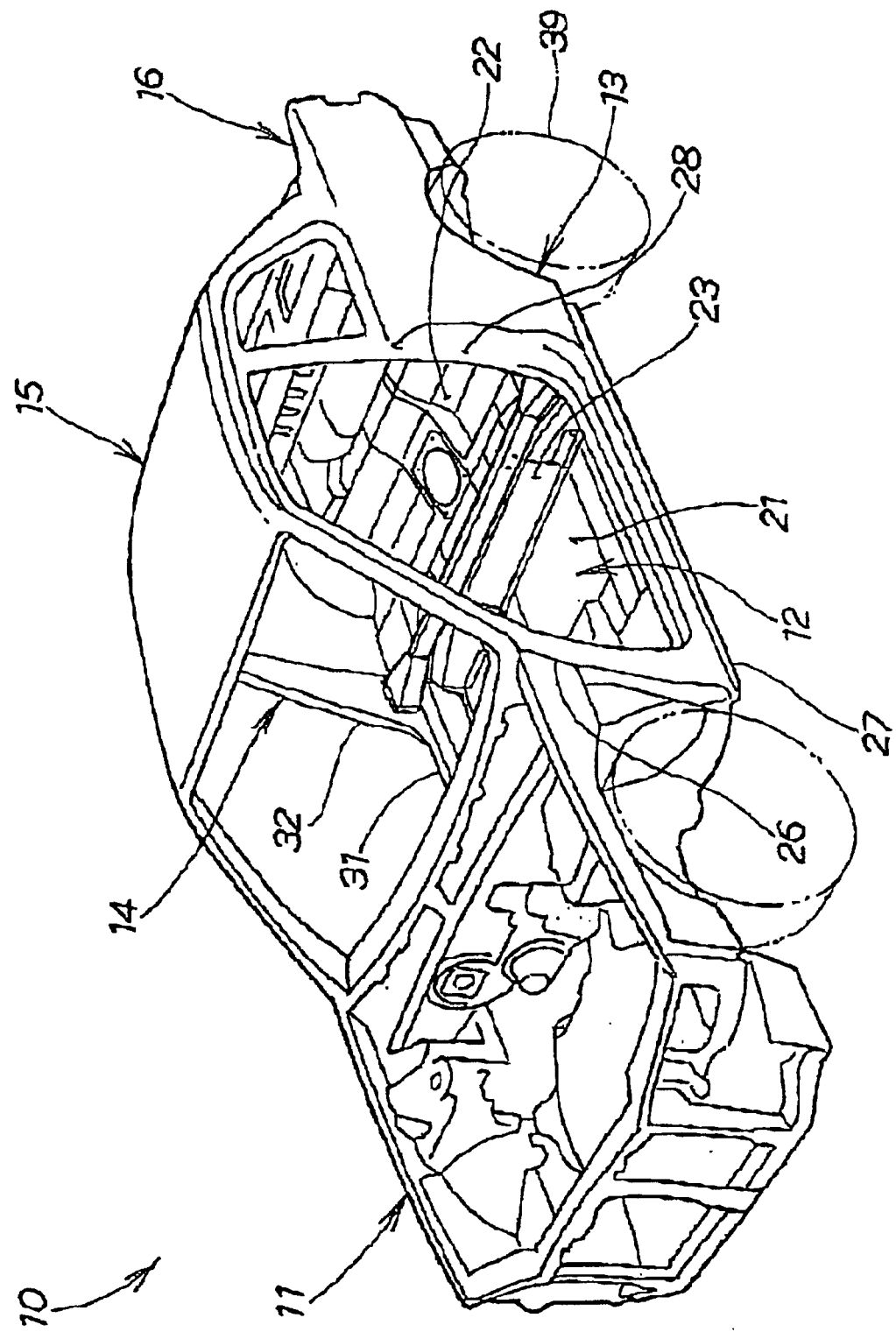
FIG. 1 is a perspective view of a vehicle body composed of a vehicle rear body structure according to a preferred embodiment of the present invention.

Referring now to FIG. 1, there is shown a vehicle body composed of a vehicle rear body structure according to the present invention. The vehicle body 10 includes a frame structure comprised of a front body 11, an underbody 12, laterally spaced left and right sides bodies 13, 14, a roof member 15 and a rear body 16.

The front body 11 has an engine space in which an engine is mounted with bearing inputs applied from front suspension units. The underbody 12 has a floor panel on which a passenger compartment and a luggage space are formed at areas rearward of the front body 11 while accommodating a fuel tank and a spare tire, etc. and further bearing inputs applied from rear suspension units. The left and right side bodies 13, 14 rise upright from the respective sides of the underbody 12 to define side walls of the passenger compartment. The roof 15 extends between respective upper ends of the side bodies 13, 14 to form a ceiling of the passenger compartment. The rear body 16 defines the luggage space at a rear part of the underbody 12.

The underbody 12 includes a front floor panel 21 which constitutes a floor of the passenger compartment, a rear floor panel 22 which serves as a vehicle body rear section forming a floor of the luggage space, and a middle floor cross member 23 located in the vicinity of a junction between the front floor panel 21 and the rear floor panel 22.

The left side body 13 includes a front pillar 26 to which a door is hinged, a sill 27 mounted to the underbody 12 at a side thereof to increase rigidity of the body, and a center pillar 28, adapted to support a rear edge of the door, to which component parts for locking the door are mounted. The right side body 14 includes a sill 31 and a center pillar 32 in a similar manner as the left side body 13.

Figure 2:
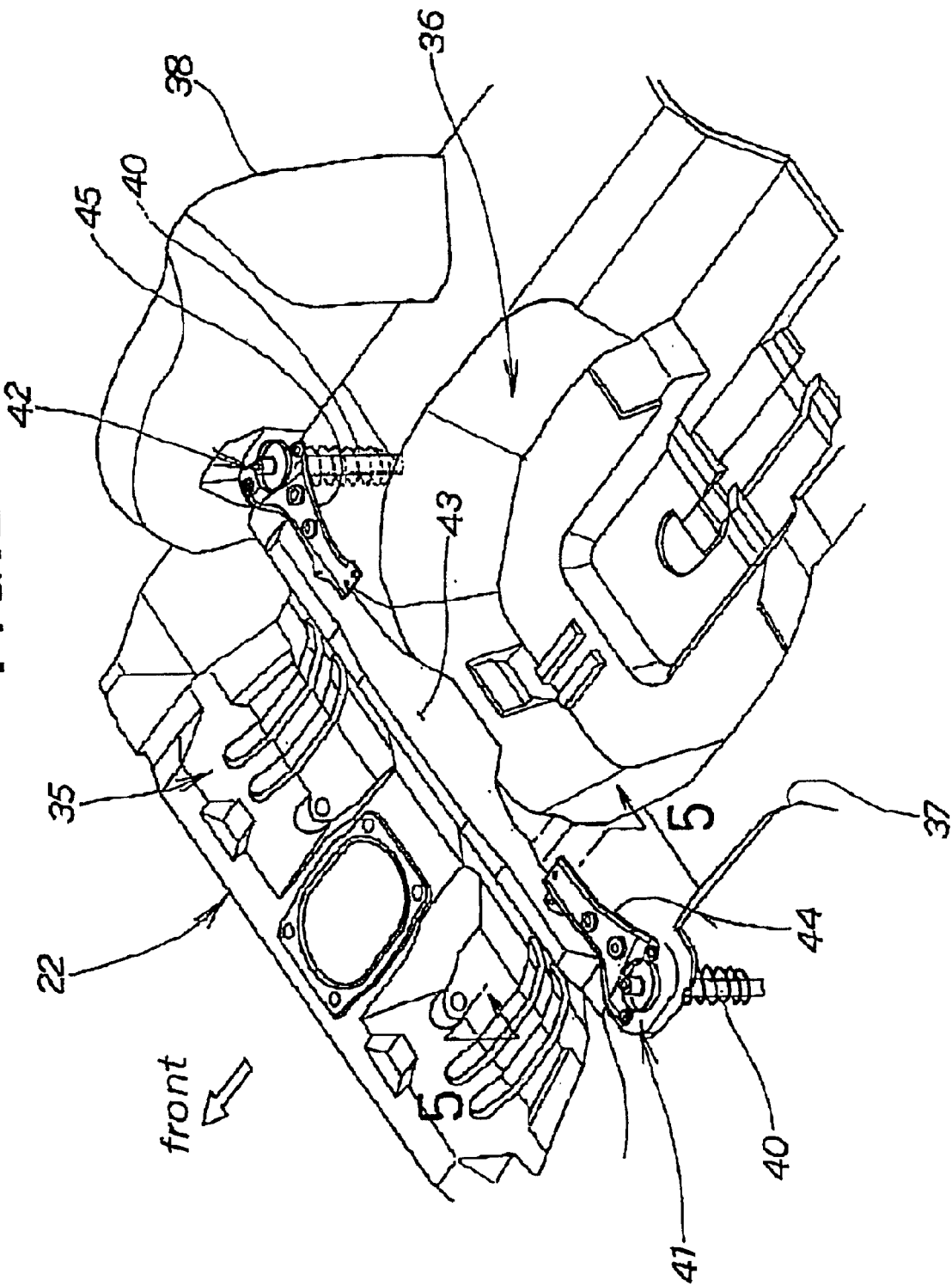
FIG. 2 is a perspective view illustrating the vehicle rear body structure according to the present invention.

FIG. 2 shows the vehicle rear body structure according to the present invention. A front portion of the rear floor panel 22 has a seat mounting section 35 on which the seat is mounted. A concave portion 36 for accommodating a spare tire is formed in the rear floor panel 22 at an area extending between a central portion and a rear part. Wheel houses 37, 38 for receiving left and right rear wheels 39, 39 shown in FIG. 1 are formed at left and right sides of the rear floor panel 22. Damper mounting portions 41, 42 are located in the rear floor panel 22 at areas close proximity to joints of the wheel houses 37, 38 for the rear wheels 39, 39, i.e., for mounting for example strut type dampers 40, 40. A rear-floor upper cross member 43, serving as a floor cross member, is joined to the rear floor panel 22 at areas close proximity to the damper mounting portions 41, 42. The rear-floor upper cross member 43 extends in a widthwise direction of the vehicle. In order for the damper mounting portions 41, 42 to have increased rigidity, gussets 44, 45 are fixedly secured to the rear-floor upper cross member 43 and the respective damper mounting portions 41, 42.

The damper mounting portions 41, 42 serve as component parts which bear inputs, delivered from the rear suspensions, such as a pushup force, a fore and aft force and a vehicular widthwise force.

The rear-floor upper cross member 43 is joined to the rear floor panel 22 to form a closed cross sectional area such that the rear floor panel 22 has an increased bending rigidity and twisting rigidity.

Figure 3:
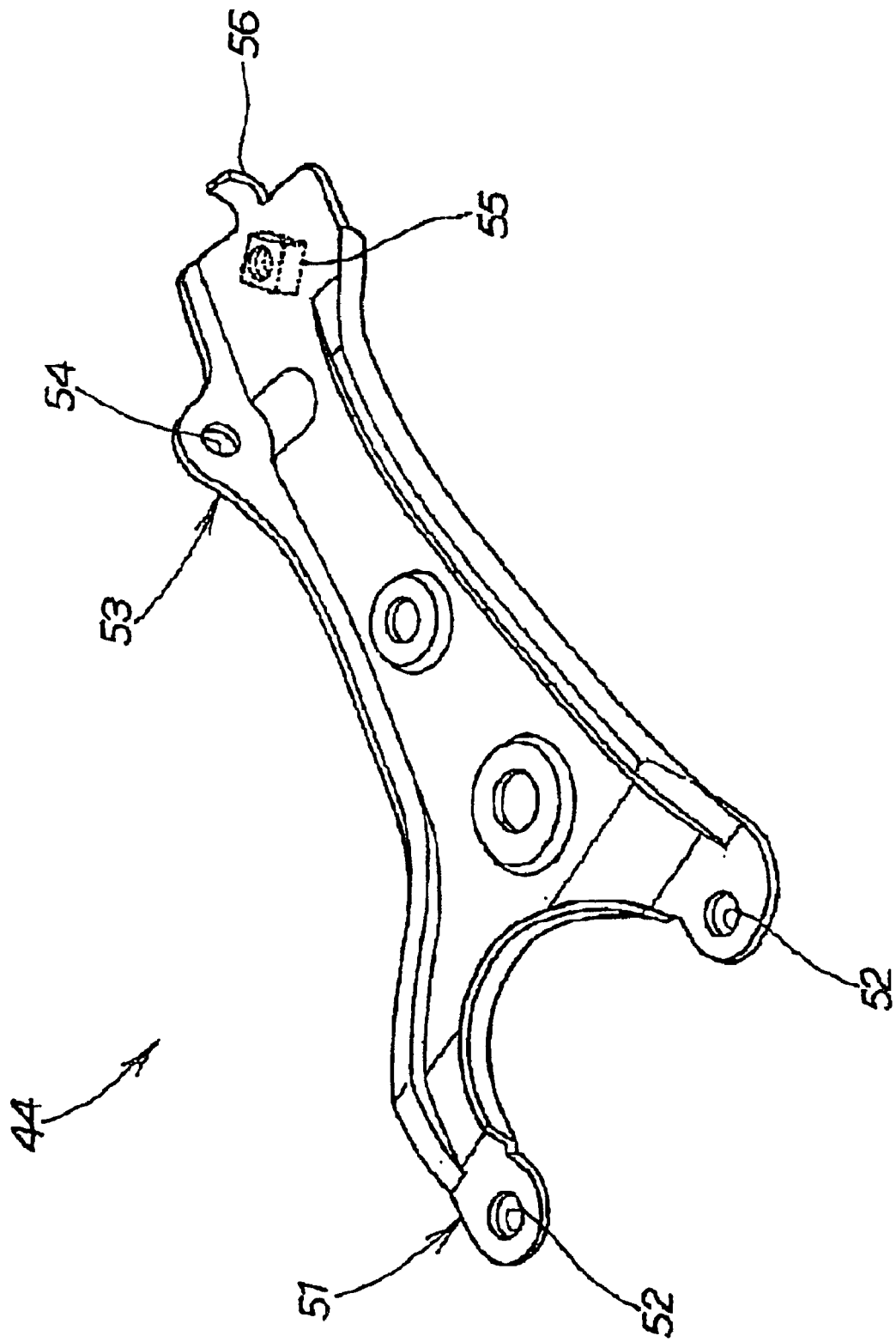
FIG. 3 is a perspective view of a gusset shown in FIG. 2.
Figure 4:
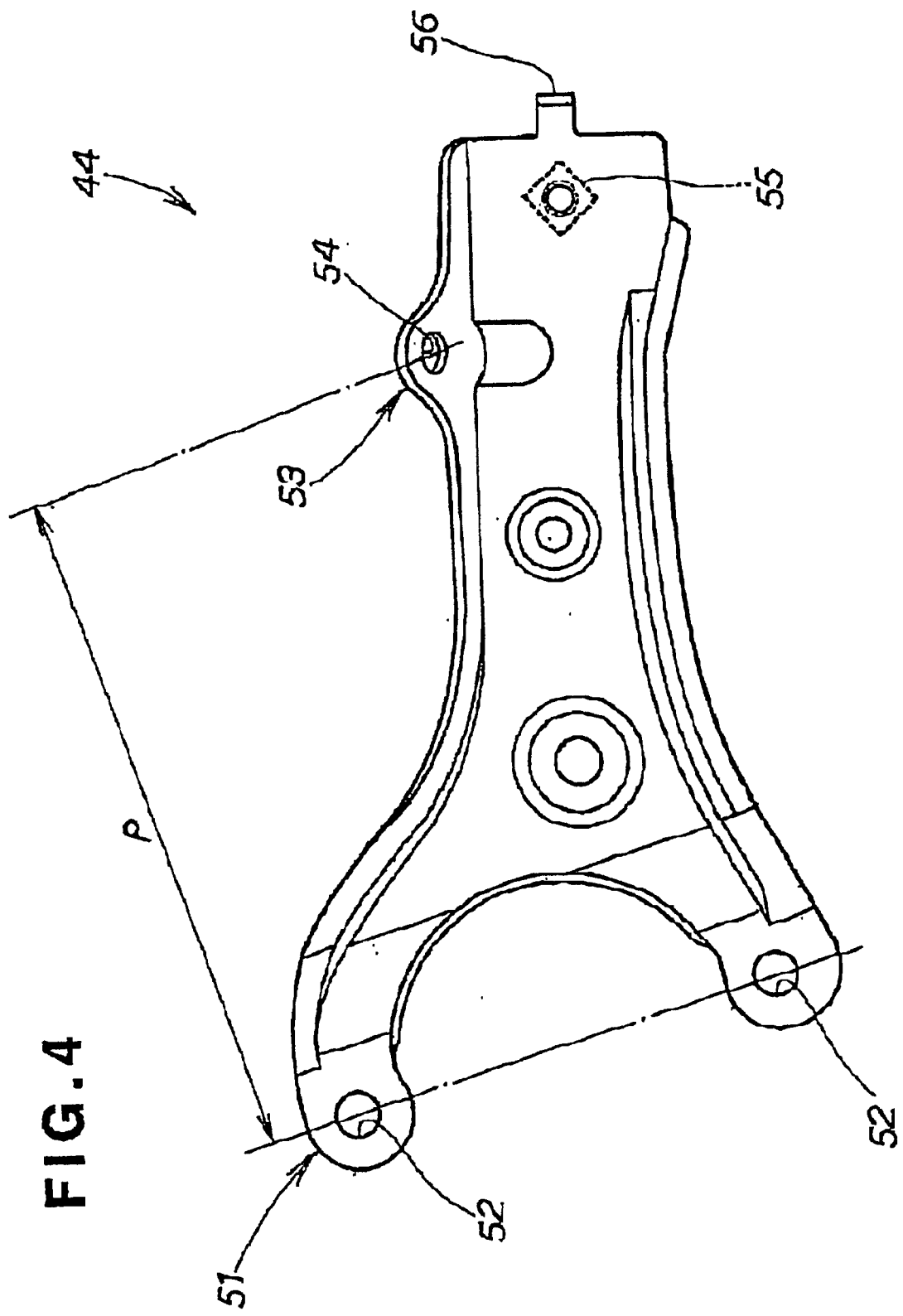
FIG. 4 is a top plan view of the gusset shown in FIG. 3.

FIGS. 3 and 4 show the left gusset 44 which forms one of the gussets 44, 45 shown in FIG. 2.

The gusset 44 includes a U-shaped terminal portion 51 adapted to be mounted to the damper mounting portion 41 shown in FIG. 2, bolt insertion bores 52, 52 formed in respective distal ends of the U-shaped terminal portion 51, a sidewise upright portion 53 adapted to be mounted to the rear-floor upper cross member 43 shown in FIG. 2, a bolt insertion bore 54 formed in the sidewise upright portion 53, and a nut 55 and an upright segment 56 located in the vicinity of the bolt insertion bore 54. The right gusset 45 shown in FIG. 2 has a shape symmetric with the left gusset 44 shown in FIG. 3 and, therefore, a detailed description of the same is herein omitted.

Figure 10:
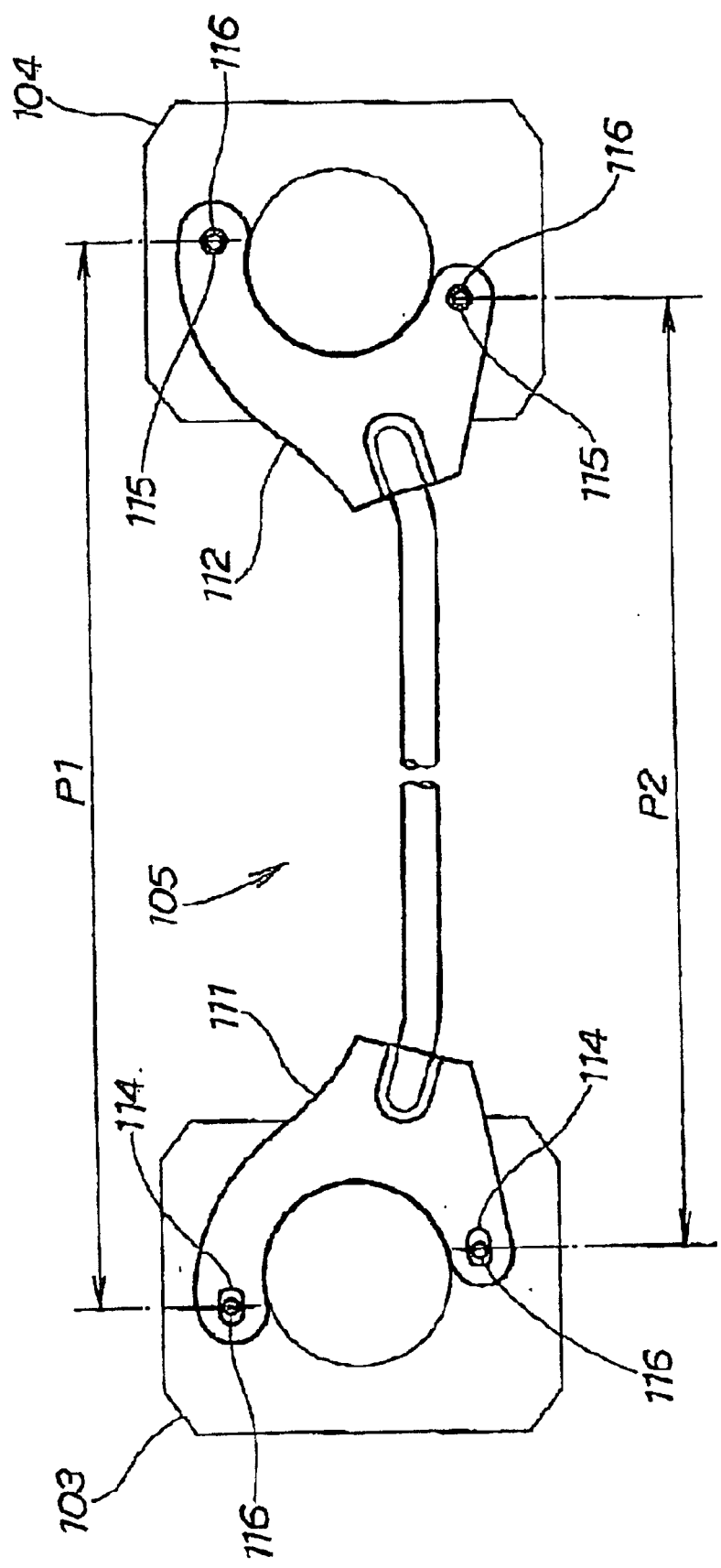
FIG. 10 is a top plan view of a reinforcement bar shown in FIG. 9.

In FIG. 4, reference character P designates a distance between each of the bolt insertion bores 52, 52 of the U-shaped terminal portion 51 and the bolt insertion bore 54 of the sidewise upright portion 53, i.e., a mount pitch of the gusset 44 with respect to the damper mounting portions 41, 42. The mounting pitch P is designed to have a shorter length than each of the mounting pitches P1, P2 (see FIG. 10), resulting in a reduced unevenness in the mounting pitch P to permit the bolt insertion bores 52, 52 and the bolt insertion bore 54 to have round shapes, instead of elongated apertures, (which has a smaller value than the longitudinal axis of the conventional elongated aperture).

Figure 5:
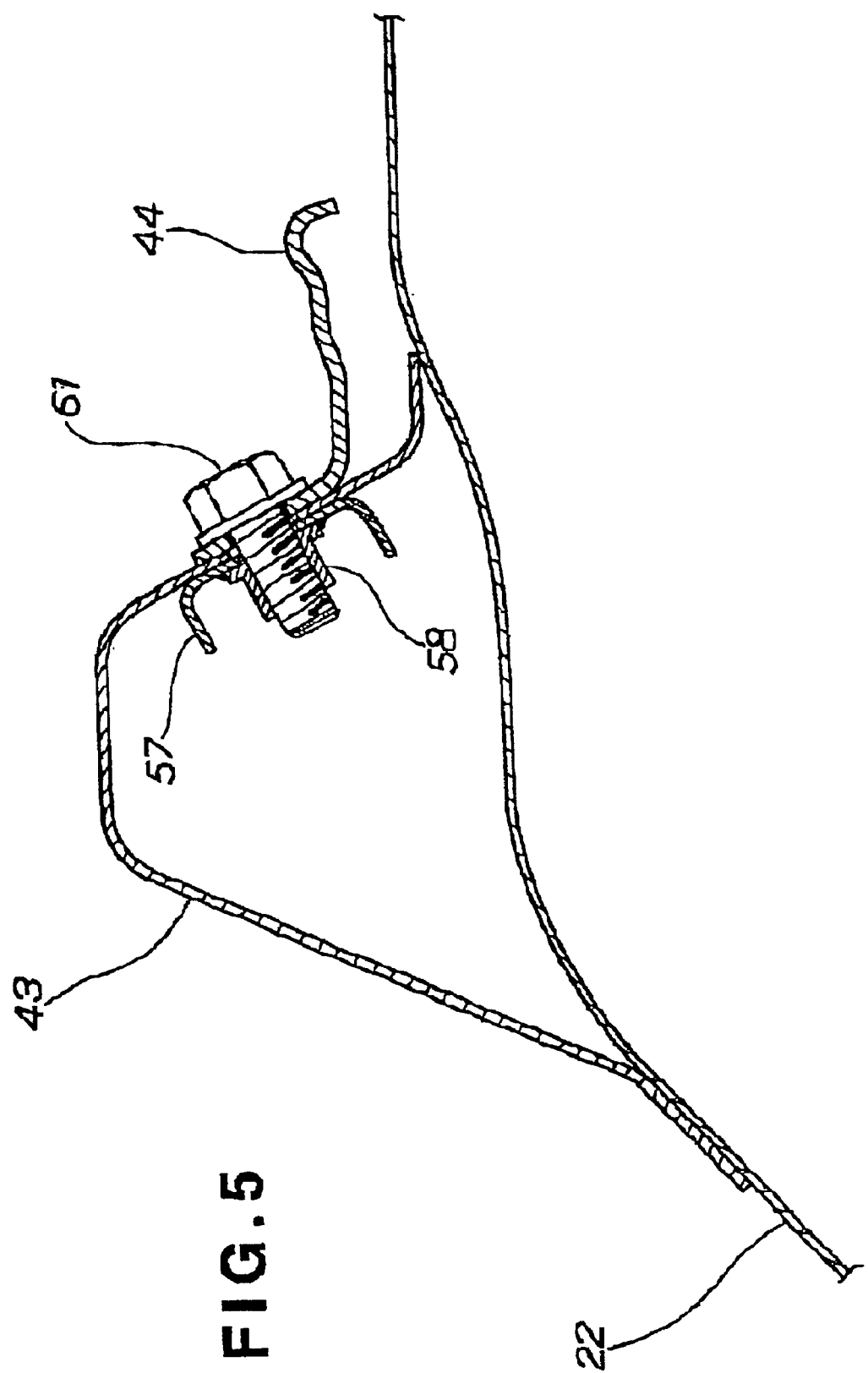
FIG. 5 is an enlarged cross sectional view taken along line 5—5 of FIG. 2.

As shown in FIG. 5, the rear-floor upper cross member 43 is secured to the rear floor panel 22. The gusset 44 is mounted to the rear-floor upper cross member 43 by means of a nut 58, with a reinforced plate 57, and a bolt 61. The nut 58 with the reinforced plate 57 is positioned inside the rear-floor upper cross member 43. The reinforced plate 57 serves to reinforce the gusset mounting portion 44 of the rear-floor upper cross member 43.

A mounting condition between the damper mounting portion 41 and the gusset 44 shown in FIG. 2 will be described below in conjunction with FIG. 8 which will be discussed later.

The vehicle rear body structure according to the preferred embodiment concerns a structure wherein the left and right damper mounting portions 41, 42 are jointed to the rear-floor upper cross member 43, at the areas closer to the damper mounting portions 41, 42, i.e., to the rear floor panel 22, composed of the rigid portion, via the left and right gussets 44, 45 for thereby reinforcing the damper mounting portions 41, 42. With the vehicle rear body structure configured in such a structure, the present invention enables the mounting pitch P of the gussets 44, 45 to be shorter than that of the reinforced bar employed in the prior art practice while increasing the rigidity of the left and right damper mounting portions 41, 42, resulting in a minimized error in the mounting pitch P.

Accordingly, for example, when tightening both the dampers 40, 40 and the gussets 45, 45 to the damper mounting portions 41, 42, since there is no need for each of the bolt insertion bores 52, 52, formed in the gussets 44, 45, to have a larger diameter than each of fixture bolts 76 (which will be described below in detail) formed at upper ends of the respective dampers, it is possible for the gussets 44, 45, which bear nuts 77 (described in detail below) screwed onto the mounting bolts 76, to have increased seating surface areas. As a consequence, even in the presence of an increased tightening torque produced by the nut 77, the seating surface is not applied with an excessively large surface pressure to prevent deformation caused during tightening operation of the nut with respect to the seating surface and a resultant crumpled phenomenon caused after the tightening operation for thereby suppressing a decrease in an axial tightening force of the mounting bolt 76 of the damper.

Further, the dampers 40, 40 and the gussets 44, 45 may be tightened together under a condition wherein the gussets 44, 45 are mounted to the rear-floor upper cross member 43, resulting in improved workability while increasing mass production capability.

Furthermore, the use of existing rear-floor upper cross member 43 for reinforcing the damper mounting portions 41, 42 with the gussets 44, 45 precludes the need for preparing component parts specific for mounting the gussets 44, 45 to the rear-floor upper cross member 22, for thereby enabling the manufacturing cost of the vehicle body 10 (see FIG. 1) from being increased.

Figure 6:
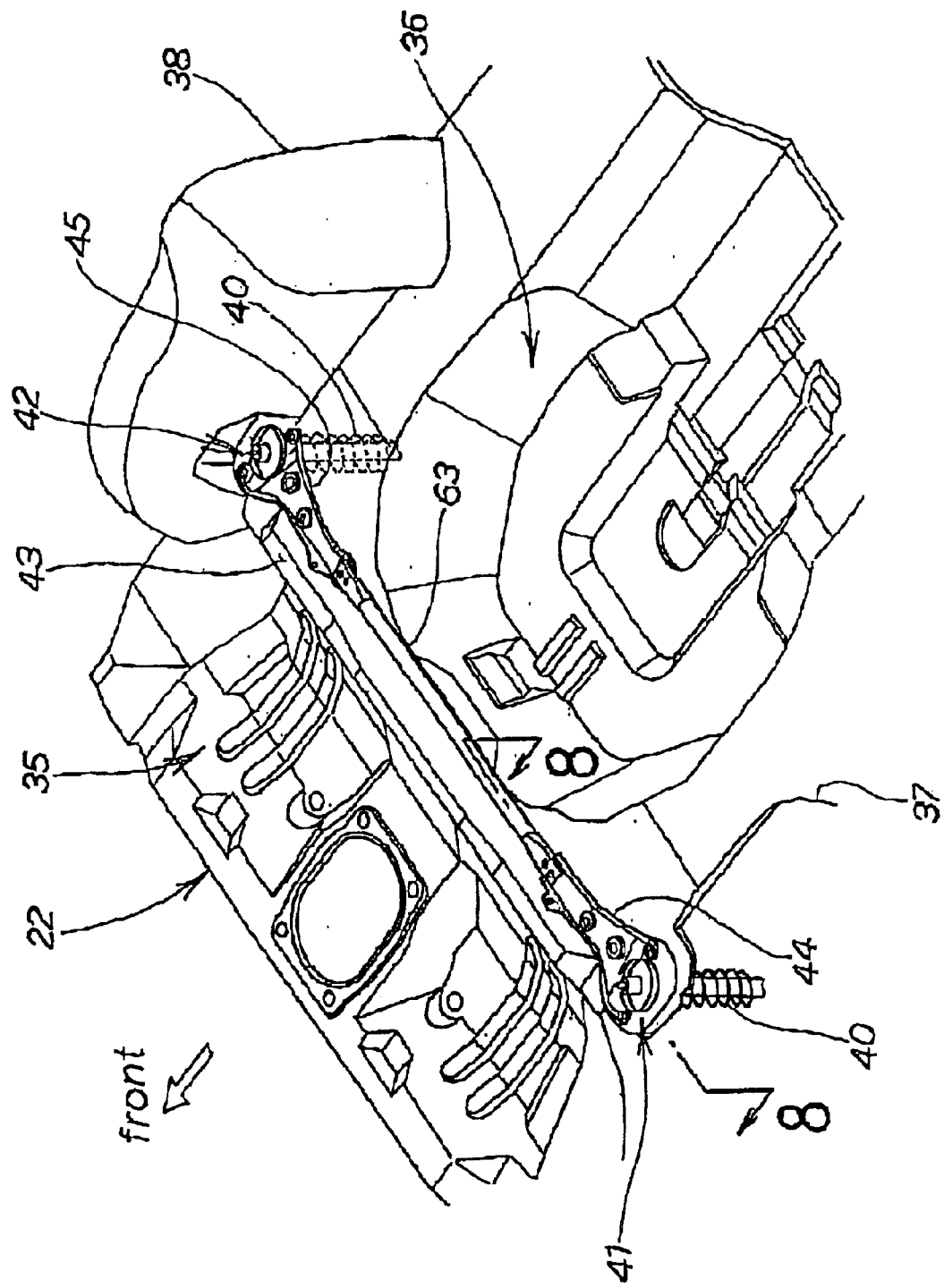
FIG. 6 is a perspective view of a vehicle rear body structure illustrating an example wherein left and right gussets shown in FIG. 2 are coupled with a crossbeam.

FIG. 6 shows the vehicle rear body structure in a state wherein the left and right gussets 44, 45 of the preferred embodiment shown in FIG. 2 are connected to one another via a crossbeam 63 serving as a rod.

Thus, the presence of the gussets 44, 45 on the rear-floor upper cross member 43 and the respective damper mounting portions 41, 42 while connecting the gussets 44, 45 with the crossbeam 63 enables the damper mounting portions 41, 42 and accordingly the rear body structure to have further increased rigidity.

Figure 7:
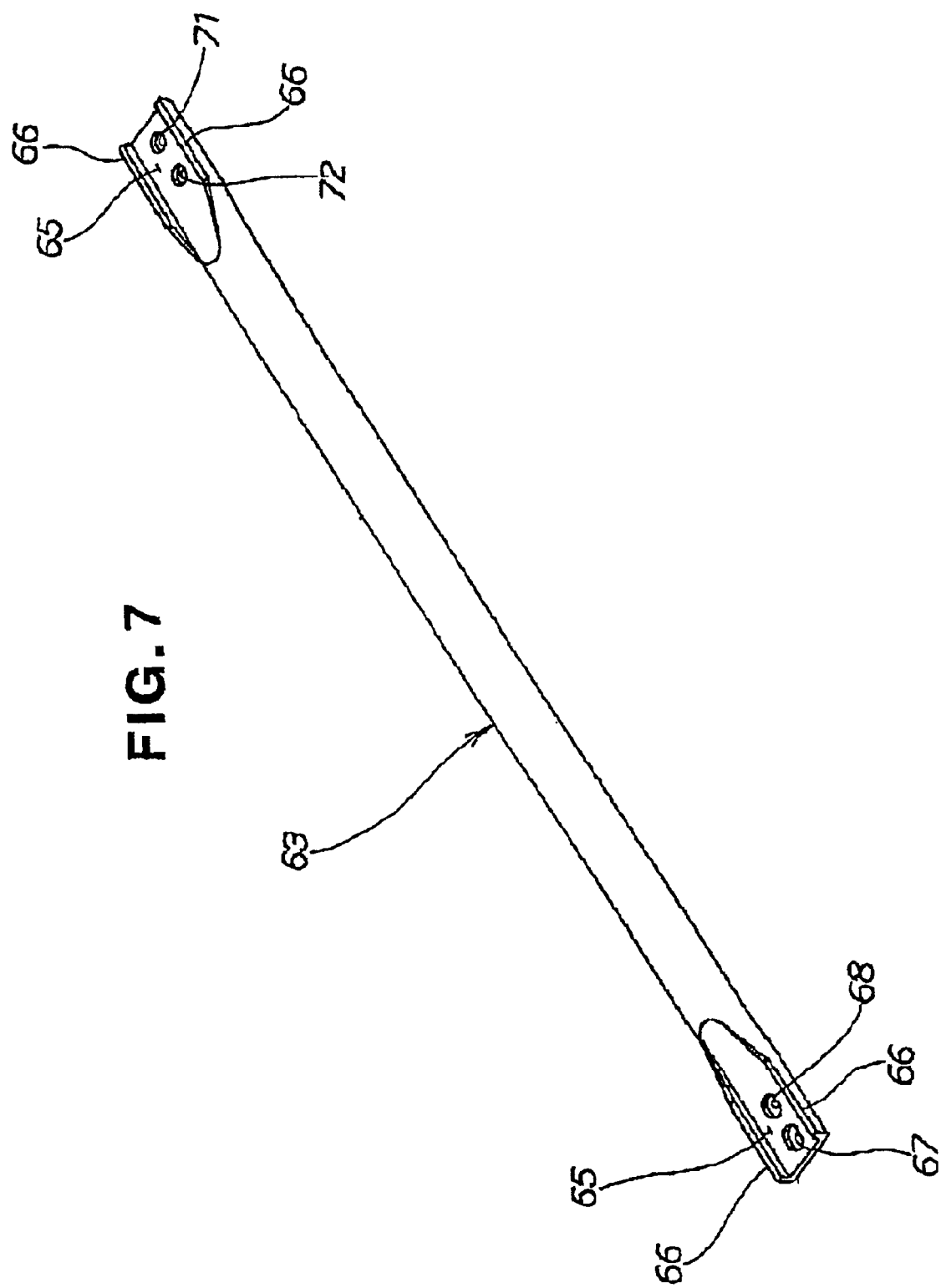
FIG. 7 is an enlarged perspective view of the crossbeam shown in FIG. 6.

FIG. 7 shows the crossbeam shown in FIG. 6. The crossbeam 63 is composed of a steel pipe having both ends formed with respective flat portions 65, with each flat portion 65 having lateral edges formed with upright ridges 66, 66 while one flat portion 65 having an elongated bolt insertion bore 67 and an elongated positioning bore 68 whereas the remaining other flat portion 65 is formed with a bolt insertion bore 71 in a round shape and a positioning bore in a round shape.

Figure 8:
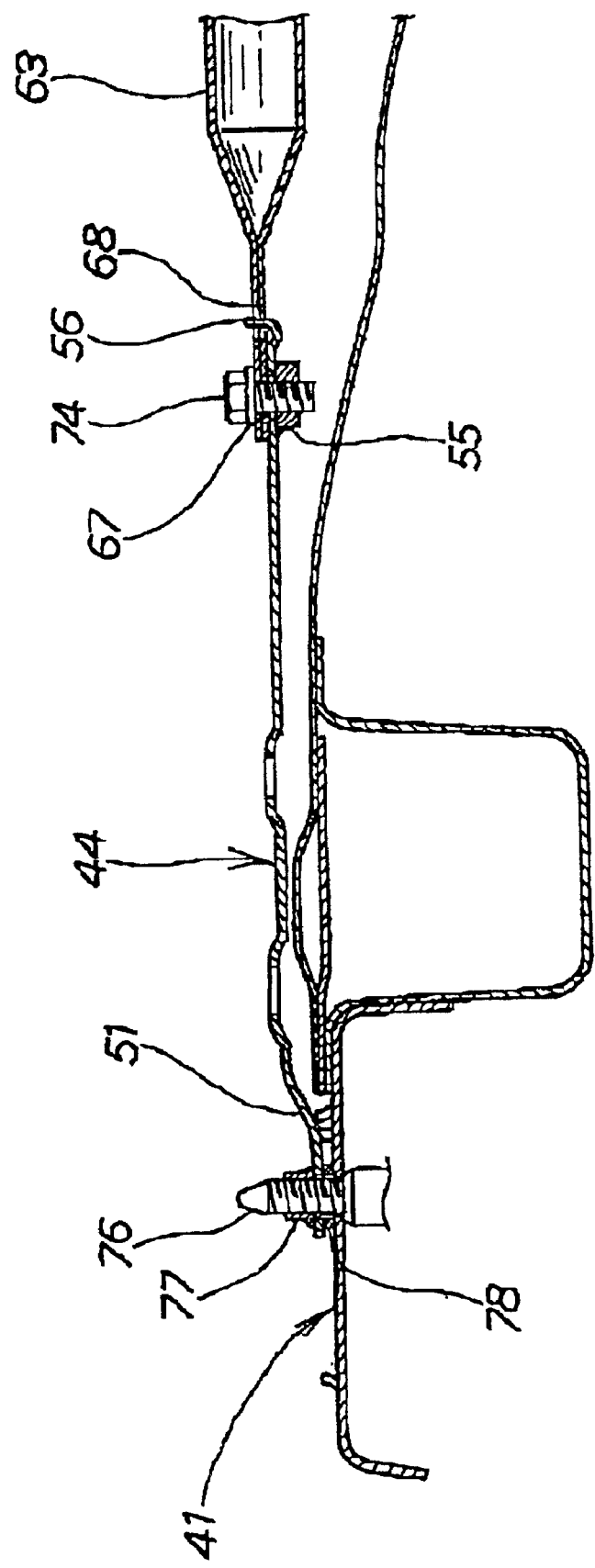
FIG. 8 is an enlarged cross sectional view taken along line 8—8 of FIG. 6.
Figure 9:
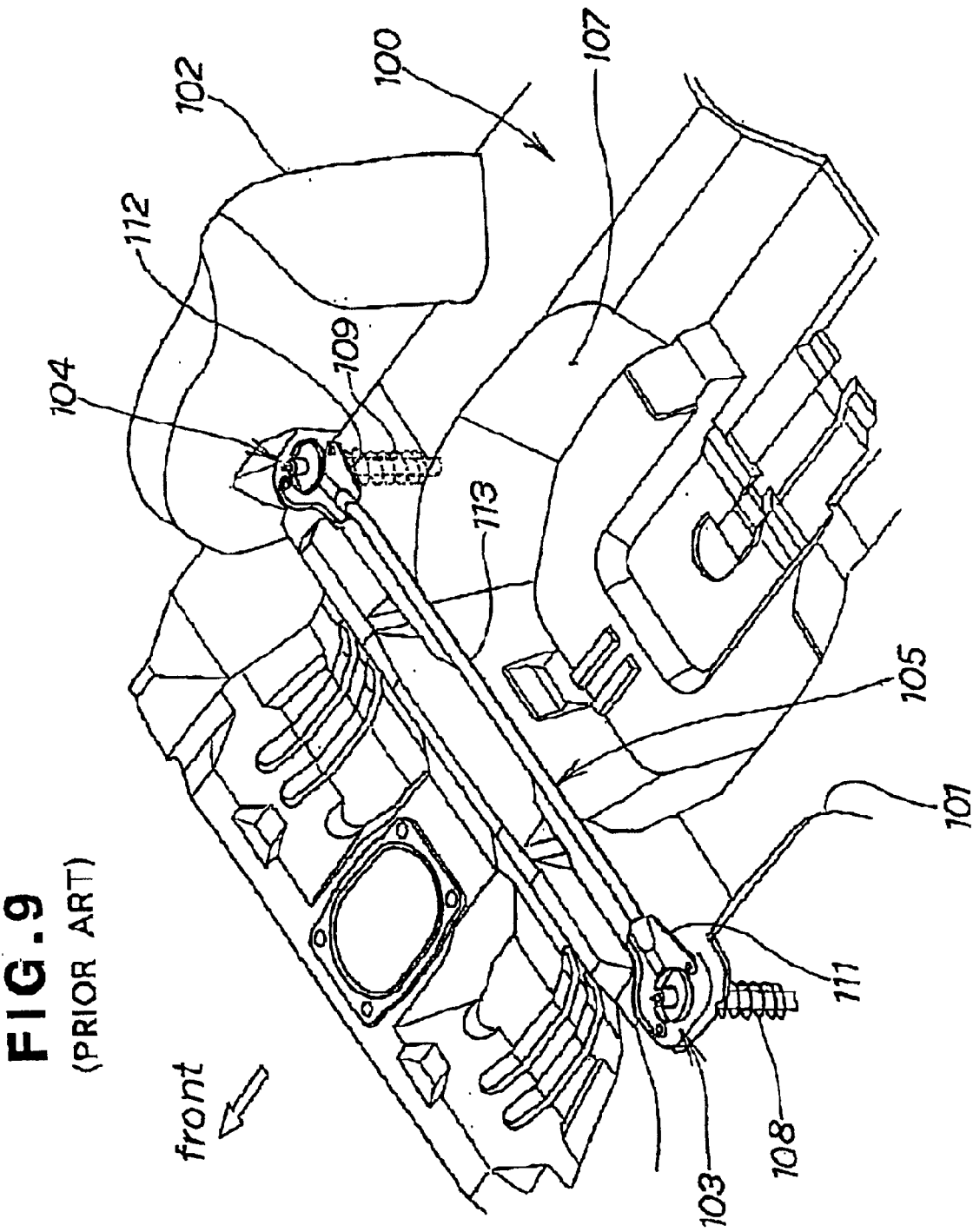
FIG. 9 is a perspective view illustrating a conventional vehicle rear body structure.

As shown in FIG. 8, when connecting one end of the crossbeam 63 to the left gusset 44, the upright segment 56 of the gusset 44 is fitted to the positioning bore 68 of the crossbeam 63 and the bolt 74 is inserted through the bolt insertion bore 67 of the crossbeam 63, with the bolt 74 being screwed into the nut 55 of the gusset 44. Similarly, mounting the other end of the crossbeam 63 to the right gusset 45 (see FIG. 2) allows the left and right gussets 44, 45 to be interconnected to one another via the crossbeam 63. Reference numerals 76, 77 designate the damper fixture bolt 76 and the nut 77 for tightening both the U-shaped terminal portion 51 of the gusset 44 and the damper mounting portion 41 with respect to one another. Reference numeral 78 designates a spacer secured to the damper mounting portion 41 by a projection welding.

Thus, by connecting the left and right gussets 44, 45 to one another via the crossbeam 63, the rigidity of the left and right damper mounting portions 41, 42 are enabled to be further increased, with a resultant increase in the rigidity of the rear body structure.

In FIG. 6, although there is shown an example wherein the left and right gussets are connected to one another via the crossbeam, the present invention may have a structure wherein an intermediate portion of the crossbeam is designed to be further mounted to the rear-floor tipper cross member.

What is claimed is:

1. A vehicle rear body structure comprising:

left and right damper mounting portions for mounting left and right dampers, which mitigate impacts transmitted from left and right rear wheels, to a vehicle body, respectively;

a floor cross member extending in a widthwise direction of the vehicle body and disposed in the vicinity of said left and right damper mounting portions; and left and right gussets secured to both the respective damper mounting portions and said floor cross member to reinforce said left and right damper mounting portions, and tightened together with the respective dampers.

2. A vehicle rear body structure according to claim 1, wherein said left and right gussets are connected to one another by a rod.

3. A vehicle rear body structure according to claim 1, wherein said left and right gussets each have a U-shaped end portion secured by two first bolts to one of the left and right damper mounting portions, first circular bolt insertion holes formed in respective distal ends of the U-shaped end portion for the passage therethrough of the first bolts, a sidewise projecting portion spaced from the U-shaped end portion in the widthwise direction of the vehicle body and secured by a single second bolt to the floor cross member, and a second circular bolt insertion hole formed in the sidewise projecting portion for the passage therethrough of the second bolt.

4. A vehicle rear body structure according to claim 3, wherein the left and right gussets are connected together by a crossbeam, the crossbeam having a bolt insertion hole and a positioning hole formed in each end of the crossbeam, each said gusset further having a nut and an upright segment both located in the vicinity of the second bolt insertion hole, the nut being disposed in registry with the bolt insertion hole of the crossbeam and the upright segment being fitted in the positioning hole of the crossbeam, each end of the crossbeam being attached to one of the gussets by a bolt extending through the bolt insertion hole in the crossbeam and threaded in the nut of each gusset.

5. A vehicle rear body structure according to claim 4, wherein the bolt insertion hole and the positioning hole at one end of the crossbeam have an elongated shape, and the bolt insertion hole and the positioning hole at the other end of the crossbeam have a round shape.

* * * * *